(12) United States Patent
Buttolph et al.

(10) Patent No.: US 12,530,678 B2
(45) Date of Patent: Jan. 20, 2026

(54) CONGESTION CONTROL PROTOCOL

(71) Applicant: Ava Labs, Inc., New York, NY (US)

(72) Inventors: Stephen John Buttolph, Brooklyn, NY (US); Patrick Robert O'Grady, Palo Alto, CA (US); Kevin Sekniqi, Sunny Isles Beach, FL (US); Emin Gün Sirer, Ithaca, NY (US)

(73) Assignee: Ava Labs, Inc., New York, NY (US)

( * ) Notice: Subject to any disclaimer, the term of this patent is extended or adjusted under 35 U.S.C. 154(b) by 66 days.

(21) Appl. No.: 18/464,150

(22) Filed: Sep. 8, 2023

(65) Prior Publication Data

US 2024/0086903 A1 Mar. 14, 2024

Related U.S. Application Data

(60) Provisional application No. 63/405,326, filed on Sep. 9, 2022.

(51) Int. Cl.
*G06F 16/00* (2019.01)
*G06Q 20/36* (2012.01)

(52) U.S. Cl.
CPC ................................ *G06Q 20/3678* (2013.01)

(58) Field of Classification Search
CPC ...... G06F 16/00; G06F 16/23; G06Q 20/3678
See application file for complete search history.

(56) References Cited

U.S. PATENT DOCUMENTS

| | | | | |
|---|---|---|---|---|
| 2022/0044241 A1* | 2/2022 | Lu | ........................ | G06Q 20/389 |
| 2023/0291569 A1* | 9/2023 | Mackenbach | ...... | G06Q 10/0875 |
| 2024/0396754 A1* | 11/2024 | Wright | ..................... | H04L 9/50 |
| 2025/0037120 A1* | 1/2025 | Kaplan | ............. | G06Q 20/3829 |

* cited by examiner

*Primary Examiner* — Cheryl Lewis
(74) *Attorney, Agent, or Firm* — McDermott Will & Schulte LLP

(57) ABSTRACT

Various aspects of the subject technology relate to systems, methods, and machine-readable media for proposing blocks to be added to a blockchain. Various aspects may include performing adding block headers to a first blockchain, wherein the block headers reference a set of validators. Aspects may also include adding a temporal parameter to each block header. Aspects may also include determining, based on a block signature from a block header and from the set of validators, a proposer of candidate blocks for addition to the blockchain. Aspects may also include sampling, based on a temporal parameter, a subset of validators of the set of validators. Aspects may include increasing the proposer to a plurality of proposers from the subset of validators by an incremental quantity based on a comparison of the temporal parameter to a threshold.

20 Claims, 7 Drawing Sheets

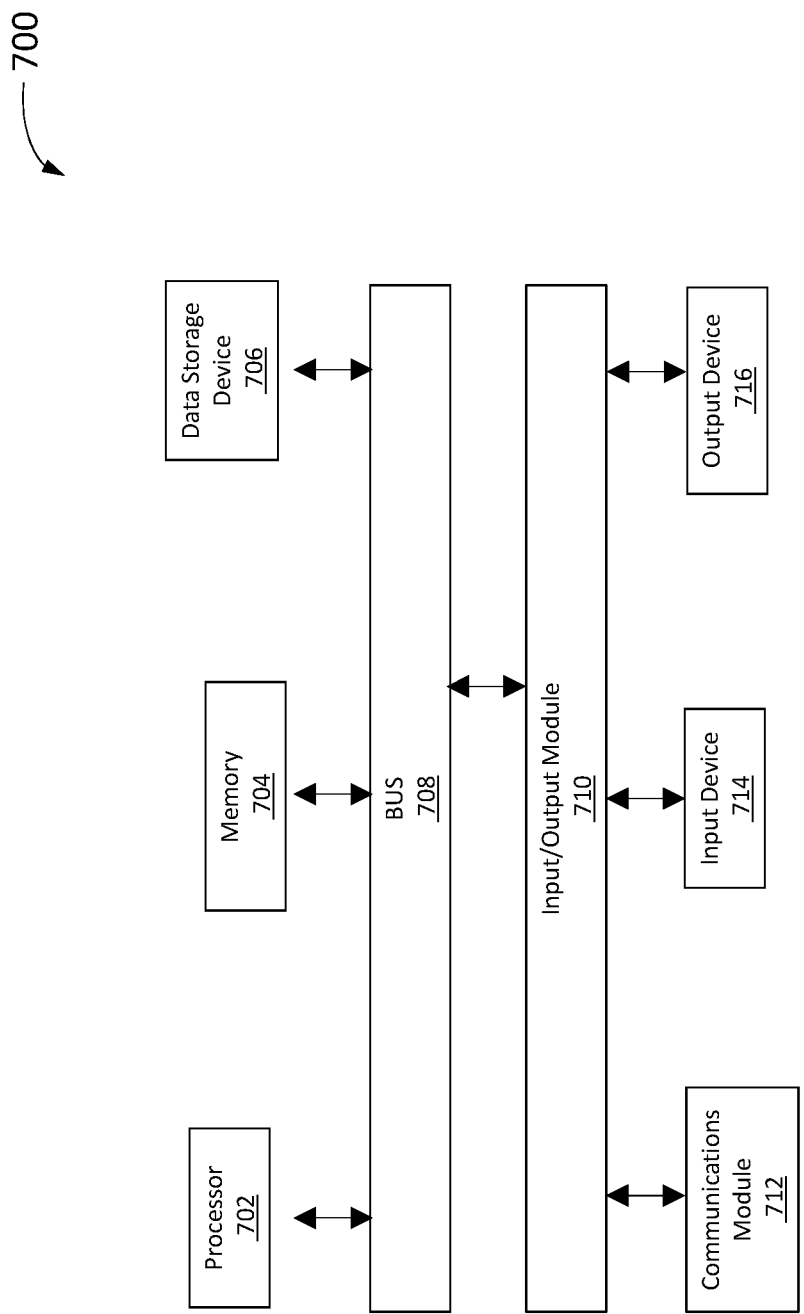

CONGESTION CONTROL PROTOCOL

CROSS-REFERENCE TO RELATED APPLICATIONS

The present disclosure is related and claims priority, under 35 U.S.C. § 119(e), to U.S. Provisional Patent Application No. 63/405,326, entitled CONGESTION CONTROL PROTOCOL, to Stephen Buttolph et al., filed on Sep. 9, 2022, the contents of which are hereby incorporated by reference in their entirety, for all purposes.

TECHNICAL FIELD

The present disclosure generally relates to a protocol (e.g., congestion, congestion and/or probabilistic protocol) for a blockchain implementation and more particularly to cryptocurrency transactions that include methods for managing modification (e.g., addition) of blocks to one or more existing blockchains.

BACKGROUND

Conventional blockchain technology includes a growing list of records, called blocks, that are linked together. A blockchain network includes nodes such as a validator node that participates in consensus. In other words, validator nodes are capable of verifying, voting on, staking and/or maintaining a record of transactions for the blockchain network as well as storing a copy of the blockchain. Validators are also responsible for producing and/or proposing blocks for addition to the blockchain network. Blockchains may require a consensus protocol as a fundamental building block for building distributed systems. Validators can participate in the consensus protocol for implementation of blockchain deployments or building on subnets.

BRIEF SUMMARY

According to embodiments, a computer-implemented method for proposing blocks to be added to a blockchain is provided. The method includes adding a plurality of block headers to a first blockchain, wherein the plurality of block headers comprises references to a plurality of validators of the first blockchain. The method also includes adding a temporal parameter to each block header of the plurality of block headers. The method also includes determining, based on a block signature from a block header of the plurality of block headers and from the plurality of validators, a proposer of candidate blocks for addition to the blockchain. The method also includes sampling, based on the temporal parameter, a subset of validators of the plurality of validators. The method includes increasing the proposer to a plurality of proposers from the subset of validators by an incremental quantity based on a comparison of the temporal parameter to a threshold.

According to embodiments, a system is provided including a processor and a memory comprising instructions stored thereon, which when executed by the processor, cause the processor to perform a method for proposing blocks to be added to a blockchain. The method includes adding a plurality of block headers to a first blockchain, wherein the plurality of block headers comprises references to a plurality of validators of the first blockchain. The method also includes adding a temporal parameter to each block header of the plurality of block headers. The method also includes determining, based on a block signature from a block header of the plurality of block headers and from the plurality of validators, a proposer of candidate blocks for addition to the blockchain. The method also includes sampling, based on the temporal parameter, a subset of validators of the plurality of validators. The method includes increasing the proposer to a plurality of proposers from the subset of validators by an incremental quantity based on a comparison of the temporal parameter to a threshold.

According to embodiments, a non-transitory computer-readable storage medium is provided including instructions (e.g., stored sequences of instructions) that, when executed by a processor, cause the processor to perform a method for proposing blocks to be added to a blockchain. The method includes adding a plurality of block headers to a first blockchain, wherein the plurality of block headers comprises references to a plurality of validators of the first blockchain. The method also includes adding a temporal parameter to each block header of the plurality of block headers. The method also includes determining, based on a block signature from a block header of the plurality of block headers and from the plurality of validators, a proposer of candidate blocks for addition to the blockchain. The method also includes sampling, based on the temporal parameter, a subset of validators of the plurality of validators. The method includes increasing the proposer to a plurality of proposers from the subset of validators by an incremental quantity based on a comparison of the temporal parameter to a threshold.

According to embodiments, a computer-implemented method for proposing blocks to be added to a blockchain is provided. The method includes adding a plurality of block headers to a first blockchain, wherein the plurality of block headers comprises references to a plurality of validators indicated by a second blockchain. The method also includes wrapping a third blockchain comprising the plurality of block headers on the first blockchain. The method also includes adding a temporal parameter to each block header of the plurality of block headers. The method also includes determining, based on a block signature from a block header of the plurality of block headers and from the plurality of validators, a proposer of candidate blocks for addition to the blockchain. The method also includes determining, for the proposer and via a corresponding block header of the plurality of the block headers, a proposed candidate block having a height corresponding to a parent block for the blockchain. The method also includes sampling, based on the temporal parameter, a subset of validators of the plurality of validators. The method includes increasing the proposer to a plurality of proposers from the subset of validators by an incremental quantity based on a comparison of the temporal parameter to a threshold.

These and other embodiments will become clear to one of ordinary skill in the art, in view of the following.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 7 is a block diagram illustrating an example computer system in which aspects of the present disclosure can be implemented.

Figure 1:
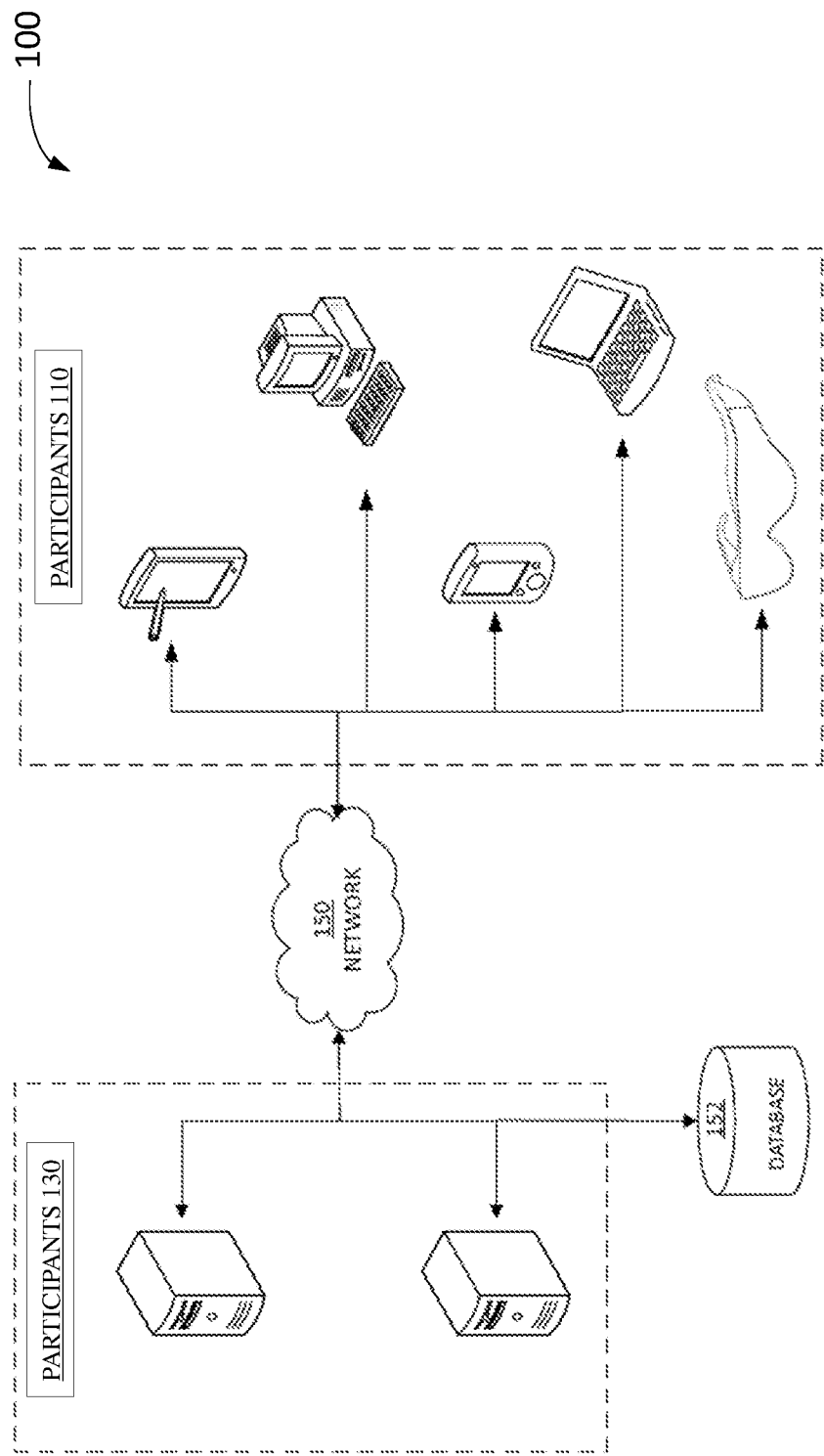
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

General Overview

Blockchain platforms, such as for smart contracts, may require a consensus protocol as a fundamental building block for building distributed systems. As an example, a blockchain platform can include multiple blockchains, such as component exchange blockchain for creating and trading digital smart assets, a metadata blockchain for coordinating validators as well as tracking and creating subnets, and a contract blockchain for creating smart contracts. As used herein, a subnet or subnetwork includes a dynamic set of validators seeking to achieve consensus on a state of a set of blockchains such that one blockchain is validated by one subnet although one subnet can validate multiple blockchains. Also, a validator node can be a member of multiple subnets and can be subject to requirements such as for security, licensing, hardware and/or the like. Blockchains being validated by validators may be blockchain networks with application-level logic defined by multiple virtual machines (VMs) which enable more decentralized networks. In particular, a blockchain may be an instance of a VM that specifies the blockchain's state, state transition function, transactions, and application programming interface (API) for user interaction.

The consensus protocol can be used to coordinate blockchains on the blockchain platform. For example, the consensus protocol can be used for the metadata blockchain and/or the contract blockchain for building consensus for validators such as for custom subnets, execution of smart contracts, etc. The consensus protocol can be an all-to-all consensus protocol, a proof-of-work consensus protocol, or an Avalanche consensus protocol. The Avalanche consensus protocol may advantageously be fast, efficient, and decentralized. By non-limiting example, the Avalanche consensus protocol can operate via repeated subsampled voting such that validators provide strong probabilistic guarantees of accuracy without communicating with every other validator on a corresponding network. Leaders may not be required such that validators can propose a block for addition to a corresponding blockchain/blockchain network at any time. Because this may result in multiple proposals being made concurrently (and require selection of which proposal to accept), it may be advantageous and a technological improvement for the consensus protocol described herein to include a congestion control mechanism. The consensus control mechanism can reduce a quantity of conflicting proposals (e.g., contention) introduced to the corresponding network, which beneficially can reduce load on the validators and blockchain commitment latency. Various aspects of the subject technology relate to systems, methods, and machine-readable media for proposing blocks to be added to a blockchain, providing a technical solution to a problem arising in the field of computer networks and/or blockchain implementations.

Blocks may be processed to be added to a blockchain via, for example, a soft proposer mechanism. A proposer is a validator that has been selected to build a block for a given slot within a specific period of time. The soft proposer mechanism may involve selecting a single proposer with an entitlement (e.g., power) to issue a block for addition and progressively expand the potential set of proposers over time. The progressive expansion may occur if a sufficient period of time has elapsed without blocks being generated for the blockchain. The single proposer and progressively expanding set of proposers can be determined based on sampling validators that act as proposers of the next block to be added to the blockchain with corresponding submission windows. If no blocks are proposed during corresponding submission windows, additional proposers are progressively permitted to propose the next block until any validator can be permitted to propose the next block. According to embodiments, the soft proposer mechanism can be implemented via introducing a block header to be included with a pre-existing blockchain being expanded with additional blocks being proposed. The block header can extend blocks of the pre-existing blockchain which advantageously may specify inputs for execution and verification rules for the soft proposer mechanism. Advantageously, this may reduce a quantity of conflicting block addition proposals (e.g., contention), which beneficially can reduce latency of commitment and load on validators associated with the blockchain.

According to embodiments, the improved consensus protocol can involve embedding an existing blockchain inside a new blockchain with additional execution and/or validation rules (e.g., of the soft proposer mechanism). This beneficially can result in restricting a quantity of blocks that can be proposed to a consensus mechanism, which improves the speed of execution of the consensus mechanism. For example, block headers can be introduced for applying the additional rules. The block headers can be a reference to an external set of validators, such as of an external blockchain. Block headers can include multiple fields, such as a parent identification field, a timestamp field, a chain height field (e.g., a height of the metadata chain), a certificate field (e.g., transportation layer security certificate), a signature field, etc. The fields may be used for applying a verification rule that enforces a soft proposer mechanism. The soft proposer mechanism of the improved consensus protocol may progressively allow more block proposers from the set of validators to become valid proposers as more time passes, which also can address blockchain interruptions resulting from proposer crashes, being turned off, or other issues that prevent a signed block from being issued to the blockchain, for example.

According to some embodiments, an additional outer blockchain such as an oracle or beacon chain may be provided. The additional outer blockchain can manage congestion control, such as the ordering of validators/proposers for the soft proposer mechanism. For example, the restriction of blocks for the consensus mechanism may be based on creating the new blockchain as a wrapper blockchain around the existing blockchain and using the additional outer blockchain as a source of sets/lists of proposers, such as to propose children blocks after a newly issued parent block is issued. As such, limits are imposable on who proposes and when children blocks are proposed. In some embodiments, the system is implemented on a single chain where the beacon chain is itself (and blocks are wrapped with its own block header). In some embodiments, the system is implemented on an external chain where a separate beacon chain is used.

According to some embodiments, the system of three connected blockchains, may implement the improved consensus mechanism that reduces a quantity of candidate blocks proposed for addition to the newly issued parent block, such as based on validating only candidate blocks of correct dimensions (e.g., size, height, etc.) based on the strict requirements specified by the block header (e.g., via the wrapper blockchain) having references to the pre-existing blockchain and validator sets of the additional outer blockchain.

Example System Architecture

FIG. 1 is a block diagram of a device operating environment with which aspects of the present disclosure can be implemented. FIG. 1 illustrates an exemplary network architecture 100 to provide a blockchain platform (e.g., blockchain network implementation/deployment platform) for managing the proposal of blocks to be added to a blockchain, according to some embodiments. The blockchain may be a linear chain of blocks of the same dimension, such as the same height, size, length, etc. Blocks of the blockchain may comprise or store data or organized information (e.g., records of information), including a cryptographic hash of the previous block, a timestamp, and transaction data, for example. The network architecture 100 of FIG. 1 includes one or more participants 110 and one or more participants 130 which are communicatively coupled through the network 150. The blockchain architecture of the network architecture 100 can be a distributed database that maintains a continuously growing list of ordered records as the blocks.

The blockchain architecture may implement a consensus protocol with a soft proposer mechanism to manage and/or limit conflicting block proposals introduced to the device operating environment. The soft proposer mechanism can prevent failure of the blockchain platform due to proposer failure (e.g., crashing, turning off, being prevented from proposing a signed block for issuance to the blockchain) based on progressively allowing more validators from a plurality of validators to become valid proposers as a temporal duration since a last proposed block increases. It is understood that the participants 130 may include the participants 110 as well, such that they are peers. As an example, the participants 130 may include a cloud server or a group of cloud servers. In some implementations, the servers 130 may not be cloud-based (i.e., may be implemented outside of a cloud computing environment) or may be partially cloud-based.

For example, the participants 110 may include any one of a laptop computer, a desktop computer, or a mobile device such as a smart phone, a palm device, or a tablet device. As an example, the participants 110 may be clients of the blockchain platform for creating, expanding, or otherwise modifying customized blockchain networks and/or private or public subnets. As an example, the participants 110 can function as validators or proposers to propose or add blocks to an existing blockchain. As an example, the participants 110 may be virtual machines (VMs) that form nodes of the blockchain network architecture 100. The participants 110 that function as nodes can run software to verify block and transaction data, store data, validate, respond to network requests for data, and/or the like for the existing blockchain. VMs can be computers that run on blockchain and allow smart contracts from multiple sources to interact with one another. The participants 110 can generate blocks upon request by the participants 130, such as via a consensus engine or module of the participants 130 at a particular time such as during a specified temporal submission window. The blocks being generated and proposed for addition to the existing blockchain may be validated as being a valid block, such as being the signed canonical block at the appropriate height for addition. Validation can be based on wrapping a blockchain around the existing blockchain to introduce a block header that includes a reference to an external blockchain to the existing blockchain. The external blockchain can function similarly to an oracle or beacon blockchain for providing an indication of block proposal ordering, priority and/or other contention parameters. For example, wrapping the blockchain can involve embedding the existing blockchain inside of the wrapping blockchain with verification logic for enforcing the soft proposer mechanism.

The reference of the block header can be read by the participants 130 to determine a validator proposer set from the external blockchain such that validator proposers of the participants 110 can be selected from the validator set for the block proposing and submission window process described herein. Moreover, the block header may include execution and verification rules for validating candidate blocks being proposed for addition to the existing blockchain. Proposer sets for sampling who can be entitled to generate and propose the blocks during their corresponding submission windows can be determined from the external blockchain. During corresponding submission windows, each of the participants 110 functioning as VM nodes may produce a block for the consensus engine of the participants 130. For example, participants 110 can function as VM validator node operators. As such, the blockchain network architecture 100 may manage validation on the external blockchain, such as validating that the candidate blocks were proposed at a valid time by a valid proposer. The network 150 may include a wired network (e.g., via fiber optic or copper wire, telephone lines, and the like) or wireless network (e.g., a cellular network, radio-frequency (RF) network, Wi-Fi, Bluetooth, and the like). The participants 110 may be any one of a mobile device, a laptop, a desktop, a tablet (e.g., palm or pad) device, a television, a display device, and/or the like. The participants 110 can be controlled by users as a set of validator nodes for making decisions in tandem, such as for facilitating operation or design of the blockchain implementations of the blockchain platform.

The blockchain network architecture 100 can incorporate application of a consensus protocol that is high throughput, totally-ordered, and effective for smart contracts. Smart contracts may refer to self-executing computer programs, applications, or contracts for executing transactions such as financial transactions involving cryptocurrency. The consensus protocol may be for agreement on the validity of user transactions, adding blocks to the existing blockchain, interaction with external resources (e.g., off-chain), etc. The consensus protocol may include the soft proposer mechanism as described herein. The consensus protocol implemented by the blockchain network architecture 100 may be a de-centralized, leaderless block proposal mechanism that handles multiple valid block proposals concurrently and limits the submission of proposals for the existing blockchain. As an example, the blockchain network architecture 100 may use repeated subsample voting and validators may provide strong probabilistic guarantees of correctness (e.g., safety and liveness) without communicating with other validators.

Furthermore, the blockchain network architecture 100 may improve block proposal by reducing the processing load/cost associated with handling multiple block proposals concurrently and being required to select a proposal of the concurrent multiple proposals. According to embodiments, the consensus protocol may be improved by virtue of being faster, more efficient, and more decentralized relative to other protocols such as an all-to-all voting consensus protocol, Nakamoto consensus protocol, proof-of-work consensus protocol, and/or the like. The consensus protocol of the blockchain platform does not need to apply reducing block time or increasing block size, which can advantageously avoid negatively impacting decentralization. Also, the consensus protocol of the blockchain platform does not need to incur power consumption and constant operational costs associated with the Nakamoto consensus protocol.

Furthermore, the blockchain network architecture 100 may improve block proposal by reducing the processing load/cost associated with handling multiple block proposals concurrently and being required to select a proposal of the concurrent multiple proposals. The wrapped blockchain and referencing block header described herein may restrict proposal so as to advantageously avoid incurring additional load on the validators and latency of commitment. Multiple participants 110 may have access to the blockchain platform hosted by the participants 130 via an online or offline connection, such as a wireless connection, wired connection, ad hoc connection, mobile connection, satellite connection, and/or the like. Each of the participants 130 may be a computing device such as part of a cloud computing server including one or more desktop computers or panels mounted on racks, and/or the like. The panels may include processing boards and also switchboards, routers, and other network devices.

The participants 130 may store data of the existing blockchain in a peer-to-peer (P2P) and/or distributed ledger fashion in a database 152. The database 152 may store relevant information regarding, for example, proposer mechanisms, added blocks, execution and verification logic and/or rules for implementing the proposer mechanisms, etc. In particular, the participants 130 may function in conjunction to autonomously manage the decentralized database(s) of the existing blockchain via the P2P network and a distributed timestamping server of the participants 130. The participants 130 may be configured to implement multiple chains of the blockchain network architecture 100. For example, the participants 130 can implement a plurality of chains of the blockchain network architecture 100, such as an asset blockchain (e.g., for creating of new assets, asset exchange, cross-subnet transfers), metadata blockchain (e.g., for coordinating validators, tracking active subnets, and creating new subnets), smart contract blockchain (e.g., for creating smart contracts and applications that require total ordering), etc. The plurality of chains can be validated by a primary network of the blockchain network architecture 100 that comprise all existing subnets.

Figure 2:
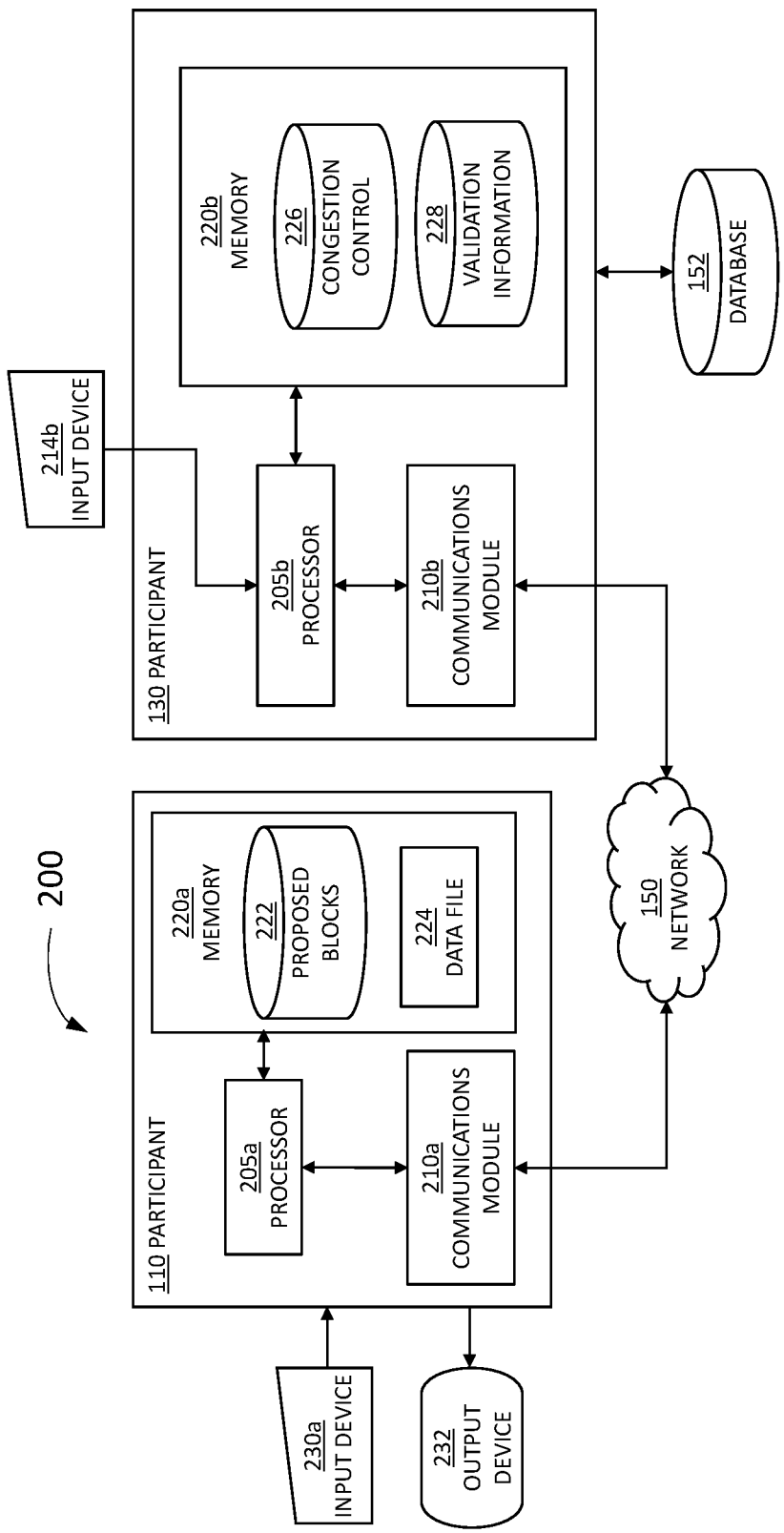
FIG. 2 is a block diagram of an example computing network of an example blockchain platform for applying a congestion control protocol for building blockchain networks or subnets, according to certain aspects of the present disclosure.

FIG. 2 is a block diagram of an example computing network 200 of an example blockchain platform for applying a congestion control protocol for building blockchain networks or subnets. The example computing network 200 may implement a soft proposer mechanism for limiting the quantity of conflicting block proposals introduced to the example computing network 200. FIG. 2 illustrates a participant (of one or more participants) 110 and a server (of one or more participants) 130 of the example computing network 200 for use in the network architecture of FIG. 1, according to some embodiments. The blockchain platform of the example computing network 200 may include blockchain validators represented by the one or more participants 110 and a plurality of platform blockchains validated and secured by a primary subnet as represented by the one or more participants 130. A subnet (subnetwork) may refer to a dynamic set of validators of the one or more participants 110 working together to achieve consensus on the state of a set of blockchains.

The primary subnet of the one or more participants 130 may be used to implement a congestion control protocol, such as a consensus protocol with a soft proposer mechanism. For example, the consensus protocol can be used to achieve consensus on the state of an exchange blockchain for creating and trading digital smart assets, of a metadata blockchain for coordinating validators as well as tracking and creating subnets, and a contract blockchain for creating and executing smart contracts. For example, the consensus protocol can be used to achieve consensus on proposal of additional blocks to an existing blockchain, such as adding a child block to an existing parent block of the existing blockchain. As an example, the existing blockchain can be a customized or created blockchain that is an instance of a VM that defines the application-level logic of the created blockchain (e.g., defines a blueprint for lower-level logic such as networking, consensus, and blockchain structure).

Each of the one or more participants 110 and the one or more participants 130 may access each other and other devices in the network 150 via corresponding communications modules 210a-210b. The communications modules 210a-210b may each include radio hardware and software such as RF antennas, analog circuitry, digital to analog conversion circuits, digital signal processing circuitry, and/or the like. The specific participant 110 and participant 130 depicted in FIGS. 1-2 may each include a processor 205a-

205*b* and memory 220*a*-220*b*, respectively. Memories 220*a* and 220*b*, and processors 205*a* and 205*b*, and communications modules 210*a* and 210*b* will be collectively referred to, hereinafter, as "memories 220" and "processors 205" and "communications modules 210." Processor 205*a* of the participant 110 may be used to operate the participant 110, such as to execute applications and functions thereof rendered on the participant 110. The participant 110 may be operated as a blockchain validator, such as to verify transactions on the existing blockchain. The participant 110 can receive rewards (e.g., cryptocurrency) in exchange for verifying transactions or for participating and staking a network token of the blockchain platform. The participant 110 can be part of a set or list of validators including other validators of the one or more participants 110.

Processor 205*b* of the participant 130 may be used to implement the consensus protocol, including the soft proposer mechanism. For example, the participant 130 can use a block header reference to determine the list of validators. For each block header, the participant 130 may deterministically sample from a corresponding list of validators for determining who can be a proposer for the next block added to the existing blockchain. The soft proposer mechanism may involve selecting a single proposer from the corresponding list of validators and providing the entitlement/power to issue the next block to the single proposer. Block production may be expanded to additional validators from the corresponding list of validators if a sufficient time has passed without blocks being generated. The congestion control and soft proposer mechanism applied by the one or more participants of the blockchain platform may be activated on any VM associated with the blockchain platform, such as without modification to internal VM configurations. A target VM, such as represented by the existing blockchain may be wrapped with (e.g., embedded into) a wrapper VM (e.g., a wrapping blockchain). The wrapper VM may be called a proposer VM and be specified with an activation time for the congestion control protocol.

The proposer VM may have a plurality of execution modes relative to the activation time, such as before, during, and after the activation time. The pre-activation execution mode (e.g., pre-fork to the activation time) may involve verifying that the rules of the blockchain have not changed prior to initiation of the congestion control protocol. For example, wrappers of a given block of the existing blockchain (e.g., pre-fork blocks) may be capable of being verified successfully. The post-activation execution mode (e.g., post-fork to the activation time) may involve enforcement of the congestion control protocol, including enforcement of the rules of the existing blockchain (e.g., inner VM to the wrapping blockchain/VM). Blocks can be verified only if they are signed by a correct validator. If a "verify" function of the given block of the existing blockchain is called, then additional verification of a wrapping block header (e.g., proposerVM.blocks) must be passed. That is, the "verify" function can involve calling "accept" or "reject" on the proposed block associated with the wrapping block header, such as based on the additional verification. During post-fork activation, rules associated with proposer/proposal submission windows can be enforced. For each parent block, there must be one deterministic proposer submission window for every child block, which may ensure that modifying the child block does not permit conflicting proposal submission windows.

As such, post-fork blocks may be issued only when a local validator node identification is in (i.e., corresponds to) its corresponding proposer submission window. Only post-fork blocks that implement options and does not require signatures may allow post-fork options to be activated. The proposal submission windows can rotate after each block is produced or issued to the existing block so as to avoid a single proposer from dominating block production. The post block issuance execution mode (e.g., fork transition execution) may involve verification of each proposerVM.block having a timestamp that follows the activation time. For example, verification can involve verifying that the children of each proposerVM.block includes only post-fork blocks and post-fork options. As described herein, the congestion control protocol of the subject disclosure advantageously may be scalable, robust, and decentralized as well as computationally efficient with low latency and high throughput.

As described herein, activation of the congestion control protocol may involve wrapping an inner block generated by the inner VM of the existing blockchain into a proposer VM.block by the proposer VM. After the activation time has elapsed, the proposerVM.block may attach a header to the inner block which carries fields indicative of the execution and verification logic that are necessary for implementing the advantages of the congestion control protocol and soft proposer mechanism component. The header can include information for controlling block congestion, which can be stored as congestion control information in the congestion control 226 of the participant 130. Also, the execution and verification logic from wrapping the proposerVM.block of the wrapper VM/blockchain may be used to implement a verification rule (or rules) to enforce the soft proposer mechanism, which can be stored as part of validation information stored in the validation information 228 of the participant 130. The inner block may be unchanged except for the attached header. In particular, the attached header may change the block ID and serialized version of the inner block. The attached header to the inner block may extend the inner block for congestion control rather than modify block production from the inner VM. A standard block header for the inner block can include the following fields such as a parent identification field, a timestamp field, a chain height field (e.g., of a blockchain platform metadata chain that implements the congestion control protocol), a certificate field, or a signature field. The parent identification field can include a parent ID of the enriched block inner block's parent (which is different from an inner block ID).

The timestamp field can indicate the local time at block production and can be stored in the database (e.g., proposed blocks 222) as proposed block information. The chain height field may indicate the block height (or other block dimension) of the most recently accepted block on the blockchain platform metadata chain at the time the inner block is produced. The certificate field can act as an identifying mechanism to verify the block signature against. By non-limiting example, the certificate field may indicate the transport layer security (TLS) certificate of the block producer (e.g., one of the one or more participants 110 functioning as validator nodes) that produces the proposed block, which can be used to verify the block signature for the soft proposer mechanism. By non-limiting example, the certificate field can reference a public key to verify the signature against. The signature field may include the signature attesting that the proposed block was proposed by the correct block producer. In this way, the soft proposer mechanism of the congestion control protocol can advantageously use the certificate field, the signature field, and any other appropriate fields to limit conflicting concurrent block proposals by ensuring only a limited proposer or quantity of proposers at corresponding submission window(s) submit proposed blocks such as via proposed blocks 222 of memory 220*a*. The submission windows assigned to each proposer represented by the one or more participant 110 can be tracked via the timestamp field.

There may be three types of the proposerVM.block, which can include the pre-fork blocks, post-fork blocks, and post-fork options described herein for implementing the plurality of execution modes. The pre-fork block may be a simple wrapper of the inner which does not change the block ID and serialized version. The pre-fork block may be an in-memory object of memory 220*b* that enables correct verification for the pre-activation execution mode. The post-fork block can add congestion control related fields to the inner block that changes the block ID and the serialized version. The serialization can involve serializing the header by the proposer VM while deferring inner block serialization to the inner VM of the existing blockchain. The post-fork option can be configured to wrap multiple inner blocks of the existing blockchain that are associated with an oracle block. In this way, oracle blocks may be issued without enforcing the congestion control mechanism, which can also cause block ID and serialization to change. The header of the post-fork option block may include a parent identification field containing a parent ID of the oracle block corresponding to the post-fork option block. Post-fork option blocks may be unsigned (in contrast to inner block standard headers) because they are deterministically generated from the corresponding oracle block.

Generally, the participant 110 and the participant 130 include computing devices including at least: the memories 220 storing instructions and processors 205 configured to execute the instructions to perform, at least partially, one or more steps as described in methods according to one or more embodiments. For example, memory 220*a* of participant 110 may be used to perform functions associated with the blockchain platform hosted by the participant 130, such as functioning as a validator node or VM to maintain the integrity of the existing blockchain. The participant 110 can be one of a plurality of validators nodes that may be organized into a small list of validators for randomly sampling proposers of the next block added to the existing blockchain. As an example, for each given existing block of the existing blockchain, the participant 130 may randomly select/sample the proposers from the small list of validators, which can be selected from the subnet's validators for the existing blockchain.

A list of the subnet's validators can be extracted by the participant 130 from the blockchain platform metadata chain. Each sampled proposer may be assigned a submission window for submitting a generated block as a candidate for being the next block. A data file 224 can be used by the participant 110 to function as a sampled/selected proposer for production of candidate blocks as proposed blocks for being the next block added. The data file 224 stored in memory 220*a* can include application settings, files, and data specific to the associated user of the participant 110 for block production. The input device 230*a* can be used to determine block dimensions for candidate proposed blocks being proposed during the corresponding submission window. Each participant that may validly produce (e.g., as indicated by the selection and submission window) may produce a block of a correct particular height and blockchain platform metadata chain as recorded in the corresponding block header. In this way, the small list of validators and/or proposers for the participant 130 to select proposers and assign submission windows for the next block can be generated independently but reproducibly by each validator node.

In particular, subnet validators active at the blockchain platform metadata chain height recorded by the corresponding block header can be retrieved by the metadata chain, validators may be canonically sorted by node identifier, and pseudo-randomly sampled by weight and seeded by a seed parameter. The seed parameter may be generated by an exclusive logical OR operation of the correct particular block height and identifier of the existing blockchain (e.g., a chain identifier that ensures different seed sequences are generated for different blockchains). In some implementations, a verifiable random function (VRF) is used to compute pseudorandom outputs and provides verifiable proof of authenticity. Moreover, a maximum window value (e.g., six) defines a quantity of subnet validators retrieved in order from the sampled set of proposers for configuration of the proposer list for the next block. As an example, each proposer on the proposer list can be assigned submission windows of specific length (e.g., duration), such as five seconds. The assigned submission windows can start based on an index position indexed from the next block's parent block's timestamp, such as indicated via the parent identification field of the block header and/or the timestamp field of the parent block. Submissions before the submission window begins may be deemed invalid, though submissions by the participant 110 can occur after the submission window and compete with submission from the next proposers.

If no blocks are proposed by any proposer during their corresponding submission windows, then any validator node is free to propose a block, which can be indicated by the maximum window value and the specific duration of submission windows. The proposed blocks can be stored in the proposed blocks 222 and be communicated to, analyzed, evaluated etc., to the participant 130. Settings of the participant 130 can be defined via user/operator input, such as via an input device 230*b*. The participant 130 can implement the congestion control described herein such as via proposer selection mechanism information stored in the congestion control 226 for applying the congestion control protocol and soft proposer mechanism. For example, the validator sets, list of proposers, and/or block proposer sampling data can be stored in the congestion control 226. The limitation on concurrent block proposals for the next block can be based on the proposer selection as well as validation conducted via the participant 130 and the validation information 228 for validation information. The validation information 228 may store data for configuring validation rules to enforce for the soft proposer mechanism, for example.

Various validation rules may be enforced so that only validated proposed blocks can be controlled for proposal during corresponding submission windows. That is, candidate blocks for being the next block must meet requirements to be validated for addition to the existing blockchain. The proposerVM.block wrapped about the block of the existing blockchain that precedes the next block can implement these validation rules. As an example, the proposerVM.block must have a parent VM block that is wrapped around the parent block of the next block of the existing blockchain. As an example, candidate blocks for the next block must have block heights that are larger than the height of the parent block and less than equal to the height of the blockchain platform metadata chain. As an example, candidate blocks must have a timestamp that is larger or equal to the timestamp of the parent block, as indicated by corresponding timestamp fields and/or the validation information 228. For example, candidate blocks received by validator nodes must meet time stamp plus max skew requirements. As an example, candidate blocks proposed by a particular proposer on the proposer list having a particular position must have its timestamp be set to a particular quantity of time (e.g., position multiplied by specific duration of assigned submission windows) after the timestamp of the parent block. As an example, candidate blocks must be signed and valid.

The corresponding proposerVM.block that violates such validation rules for a given parent block (i.e., parent block of the next block being added to the existing blockchain) may be marked as invalid. However, invalidity of the corresponding proposerVM.block does not necessarily indicate that the corresponding parent block is invalid. Moreover, the validation rules can be configured such that only one verification attempt is issued to a valid candidate block while multiple verification calls can be issued to invalid candidate blocks. Also, rejection of a particular proposerVM.block does not entail rejection of the particular inner block that it wraps since different proposerVM.blocks may wrap the same parent/inner block. The participant 110 may be used by a user of the blockchain platform, such as to perform blockchain validation, block proposal, and other blockchain functions, such as via a graphical user interface (GUI) screen rendered on the participant 110. For example, the participant 110 may be coupled to at least one input device 230a and output device 232 accessible by the user (e.g., for user input and output perceivable by the user). The input device 230a can include a mouse, keyboard, a pointer, a stylus, a touchscreen display, microphone, voice recognition software, graphical user interface (GUI), and/or the like. The output device 232 can include a display (e.g., the same touchscreen display as the input device), a speaker, an alarm, and the like.

Although the above description describes certain functions being performed by the processor 205a of the participant 110 and other certain functions being performed by the processor 205b of the participant 130, all of the functions described herein can be performed by the participant 110 and/or the participant 130 in some other alternative division of labor. That is, the processors 205 could perform more or less of the functions described above. In some embodiments, some or part of the participant 110 can be co-located with the participant 130. That is, the participant 130 can be remote from or both the participant 110 and the participant 130 can be part of the same larger computing system, network, or architecture.

It is also understood that participant 110 may include congestion control and validation information in its memory 220a, and participant 130 may include proposed blocks and data files in its memory 220b, such that they have parallel structures.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s)

Figure 3:
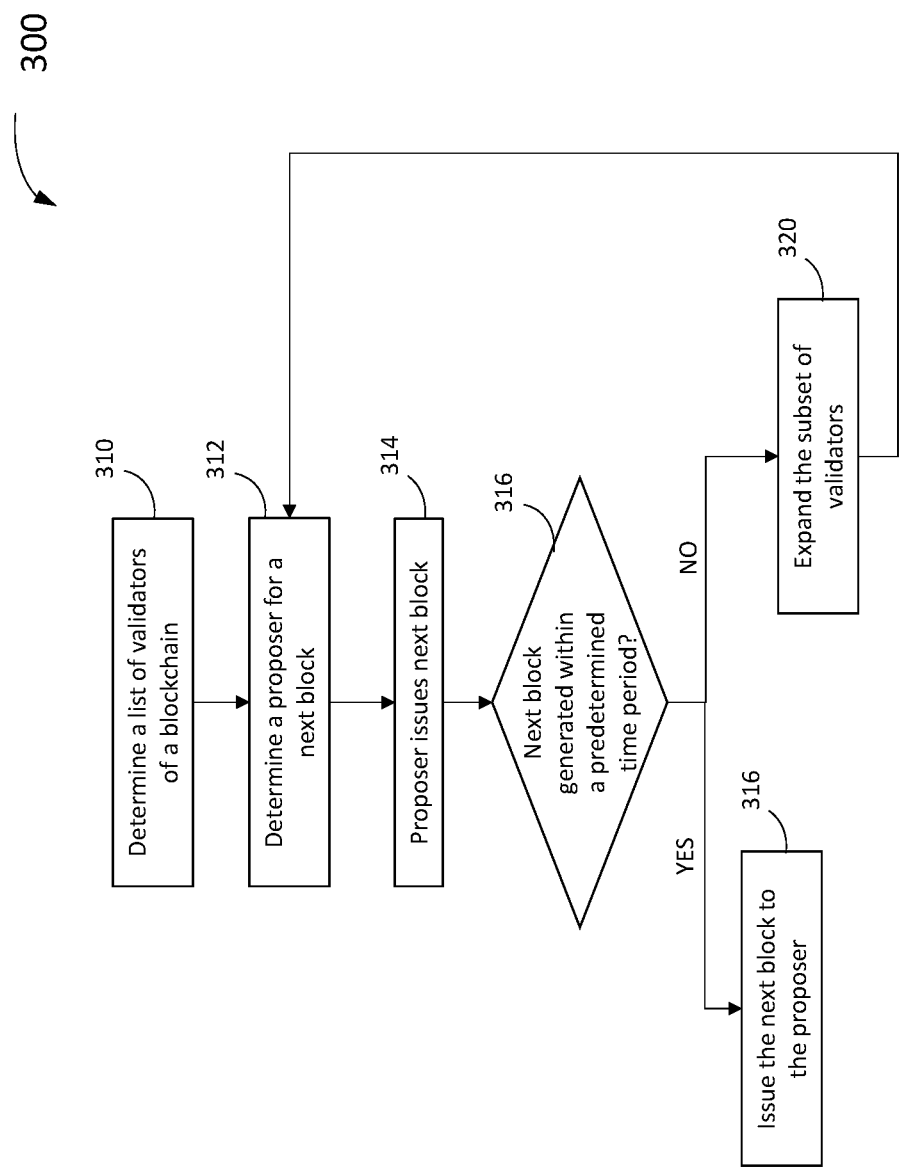
FIG. 3 is an example flow diagram for implementing a congestion control protocol, according to certain aspects of the present disclosure.

FIG. 3 illustrates an example flow diagram of a method 300 for implementing a congestion control protocol on a VM associated with the blockchain, according to some embodiments. Operations in the method 300 may be performed by one or more of, for example, the participants 110/130. Further for explanatory purposes, the operations of the example method 300 are described herein as occurring in serial, or linearly. However, multiple instances of the example method 300 may occur in parallel.

As shown in FIG. 3, in operation 310, the method 300 includes determining a list of validators of a blockchain based on a block header reference associated with the blockchain. The operations 310-320 may be performed for each block header associated with the blockchain.

In operation 312, the method 300 includes determining a proposer for a next block by sampling a subset of validators from the list of validators.

In operation 314, the method 300 includes the proposer issues the next block.

In operation 316, the method 300 includes determining whether the next block is generated within a predetermined time period. If it is determined that the next block is generated within the predetermined time period (YES at operation 316), the congestion control protocol is implemented at the VM associated with the blockchain. In some implementations, the VM is specified based on an activation time corresponding to the congestion control protocol.

If it is determined that the next block has not been generated within the predetermined time period (NO at operation 316), the method proceeds to operation 320. In operation 320, the method 300 includes expanding the subset of validators to include more validators from the list of validators. Subsequently, the method 300 may return to operation 312.

Figure 4:
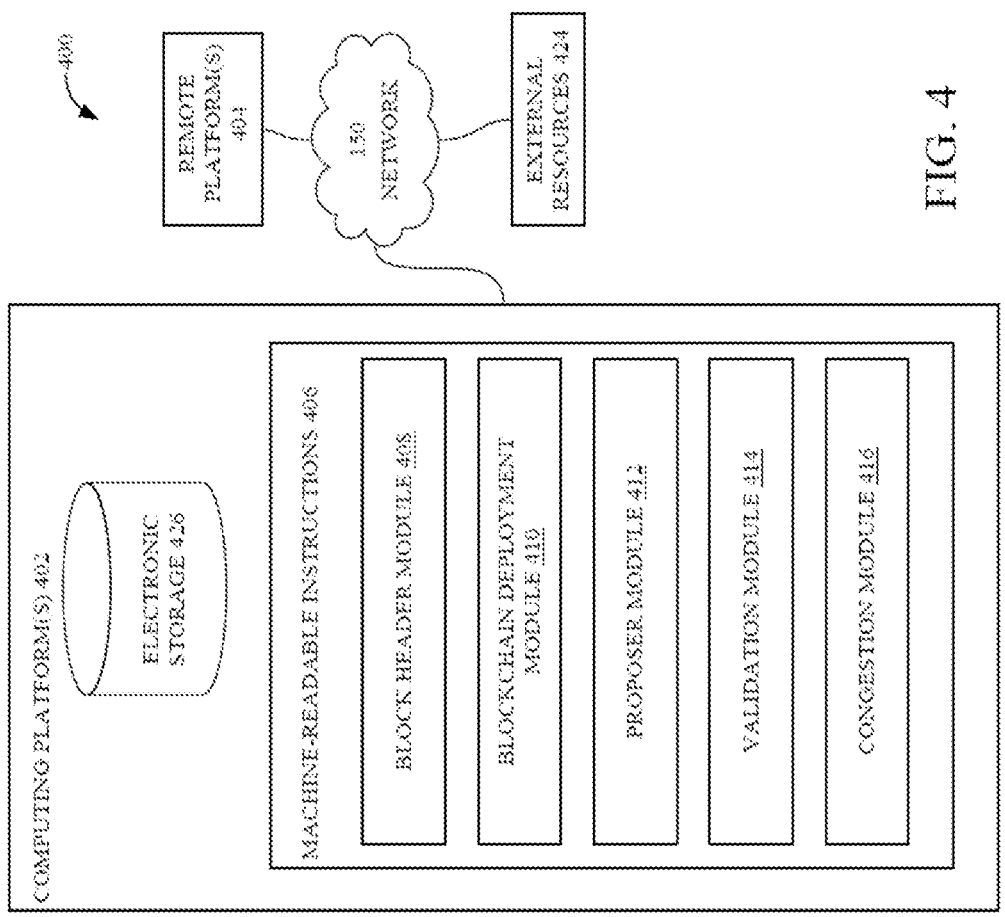
FIG. 4 is a block diagram illustrating an example computer system with which aspects of the subject technology can be implemented.

FIG. 4 is a block diagram illustrating an example computer system 400 with which aspects of the subject technology can be implemented. The system 400 may be configured for managing proposing blocks to be added to a blockchain, according to certain aspects of the disclosure. For example, adding (e.g., appending) proposed blocks to an existing chain can be controlled by a congestion control protocol/mechanism which advantageously may include a soft proposer mechanism for limiting a rate of and/or how blocks are introduced as proposed blocks to the system 400. The system 400 can be or include a blockchain system/platform for managing blockchains, each of which may be a linear chain of blocks such that each block has a parent block. For example, the congestion control protocol/mechanism can include a consensus component/mechanism to decide between two different candidate blocks of the same height to maintain the linear chain for block addition. Advantageously, the congestion control protocol/mechanism may reduce the quantity of conflicting options for candidate blocks at a specific height such that only one proposed block or a reduced set of blocks are proposed to the system 400 for addition to the existing linear blockchain. This may be achieved based on the system 400 causing introduction of a wrapper around all blocks of the existing blockchain that imposes strict requirements to impose more restrictive definitions of who (e.g., designated person, group of people) can be a valid proposer of the candidate block(s) proposed for addition to the existing blockchain. As an example, the introduced wrapper may include a header that imposes a signature requirement.

Requiring a block to be signed by the corresponding proposer of the candidate block(s) could beneficially limit who is allowed to propose blocks. The introduced wrapper can be used to impose a plurality of validation and/or verification steps to the underlying existing blockchain. The introduced wrapper can be in the form of an outer blockchain of wrapping header blocks that the existing blocks of the existing blockchain may be embedded into, which advantageously adds execution and verification logic to reduce conflicting proposed block contention to more efficiently determine the specific proposed block being added (e.g., for a block to be accepted, it must be the only child block of its parent block). In this way, situations in which the consensus mechanism is required to pick between multiple proposed blocks of the same height (or other dimensions) for the same parent block can be reduced. That is, if there is only one proposed block, the consensus mechanism effectively does not need to select between proposed blocks. This may improve the efficiency and speed as well as reduce the processing cost of the congestion control protocol/mechanism. In some implementations, the system 400 may include one or more computing platforms 402. The computing platform(s) 402 can correspond to a server component of the blockchain platform, which can be similar to or the same as the participant computing device(s) 130 of FIG. 1 and include the client computing device(s) 110 of FIG. 1.

Computing platform(s) 402 can be configured to implement a specific blockchain arrangement including wrapping headers and references to an external blockchain to improve consensus (e.g., contention control) for the client computing device(s) that are validators and can be validly selected as proposers. The computing platform(s) 402 may be configured to communicate with one or more remote platforms 404 according to a client/server architecture, a peer-to-peer architecture, and/or other architectures. The remote platform(s) 404 may be configured to communicate with other remote platforms via computing platform(s) 402 and/or according to a client/server architecture, a peer-to-peer architecture, and/or other architectures. Because processing concurrent block proposals of candidate blocks of the same height for consensus can be burdensome, the computing platform(s) 402 may address this limitation with a header that requires a signature of a specific validator/proposer (e.g., determined based on a rolling window). In this way, the speed and efficiency of processing concurrent block proposals by the computing platform(s) 402 via the congestion control protocol can be improved. As an example, the remote platform(s) 404 can include a validator set of validator nodes from which one or more valid block proposers may be sampled for determining what signature is required by the header.

For example, when a new block is produced and issued to the existing blockchain, this can cause the computing platform(s) 402 to generate a list of next proposers so that the required signature can be determined via the rolling window. For example, the list of next proposers can be set at six proposers (or any other suitable quantity/number) and be given a proposal/submission window (e.g., of the rolling window), which can last for a duration of five seconds or some other suitable period of time. After a threshold period of time, such as the thirty seconds that spans all six submission windows or some other suitable time threshold, block proposal can be expanded to any valid validator (all of the validators of the remote platform(s) 404) or expanded by an incremental quantity. After validation based on the logic from the headers of an outer wrapping blockchain that is wrapped around the embedded inner existing blockchain, the validated proposed block(s) may be passed to a consensus portion of the congestion control protocol. In other words, the soft proposer mechanism portion of the congestion control protocol may advantageously control who can be on the list of next proposers and how they can propose blocks so that conflicting block proposals are limited.

The validators and/or next proposers (e.g., source of validators) can be determined based on references added to the block headers that refer to an external third blockchain (not pictured in the computer system 400). The external third blockchain may define an actual order of the congestion controls of the congestion control protocol. As an example, the referenced external blockchain can manage blockchains and who is actually a validator. For example, the referenced external blockchain can be (or can use a beacon to another different blockchain) analogously to an oracle or seed to provide external support for the congestion control protocol. For example, the beacon of the different blockchain may be used for consensus ordering. In this way, the contention control protocol can be seated by the processes of another blockchain (e.g., referenced external blockchain) for limiting contention. As such, any external platform built based on a platform/metadata chain of the computing platform(s) 402 that relies on the referenced external blockchain as a beacon may also realize the benefits of the consensus portion and/or soft proposer mechanism of the congestion control protocol. In this way, the platform chain may enable contention control on all subnets associated with the computing platform(s) 402. The consensus portion may be configured for determining whether the validated block(s) are canonical block(s) at the requisite height and dimension for being added to the corresponding parent block(s). The computing platform(s) 402, external resources 424, and remote platform(s) 404 may be in communication and/or mutually accessible via the network 150.

The computing platform(s) 402 may be configured by machine-readable instructions 406. The machine-readable instructions 406 may be executed by the computing platform(s) to implement one or more instruction modules. The instruction modules may include computer program modules. The instruction modules being implemented may include one or more of block header module 408, blockchain deployment module 410, proposer module 412, validation module 414, congestion module 416, and/or other instruction modules.

The block header module 408 is configured to introduce or apply a block header to be included with the existing blockchain. Block headers may be applied to all blocks of the existing blockchain to include a payload for performing the additional execution and verification logic and/or rules for implementing the soft proposer mechanism. For example, the payload may specify inputs to the execution and verification rules. For proposing candidate block(s) for addition to the existing blockchain, the block header may be added to a parent block to execute the additional logic and rules. In this way, proposers can be sampled/selected and given the rolling window(s) for block production so that conflicting block proposals can be managed via the logic and rules. The execution and verification rules may include various validation and verification checks/rules including a validator/proposer signature requirement so that the validator proposer(s) producing child block(s) of the parent block for consideration can be incrementally presented and limited to reduce computational processing time and load. That is, the block header module 408 may ensure the produced child block(s) are validly signed by valid proposers who are entitled to propose blocks for the parent block. The block header for the parent block may include security protections for ensuring that any entities or actors that are entering or accessing the parent block cannot cause unauthorized changes or modifications to corresponding proposal lists of the parent block's direct child blocks. Such security protections may be included in the execution and verification rules to protect the integrity of the randomness of deterministic sampling of the validators of the computing platform(s) 402.

The blockchain deployment module 410 is configured to cause the wrapping/wrapper blockchain to be created and wrapped around an existing blockchain. In this manner, the inner blockchain can be embedded as an inner blockchain around the outer existing blockchain. According to embodiments, the wrapping blockchain can include references for generation of lists of proposers for direct children blocks of the parent block(s) that are subject to or facilitate building or expanding of the existing block. The references may be to the external third blockchain for generating the list of proposers by the computing platform(s) 402. Based on the references, the wrapping blockchain can read the external third blockchain. For example, the references can be added to the block headers created by the block header module 408 and refer to the existing blockchain as well as to the external blockchain for any data required to calculate the list of proposers. The blockchain deployment module 410 can also manage a network of blockchains that are part of the computing platform(s) 402.

The computing platform(s) 402 can control expansion or pruning of the existing blockchain, including blockchain branches. The computing platform(s) 402 may facilitate the implementation of block headers and references. As such, the blockchain deployment module 410 and the block header module 408 can add references to the validator sets from the external blockchain for blocks of the wrapping blockchain. Thus, block proposer sets can be obtained from an external data source, such as the external blockchain. For example, a given reference to the corresponding current validator set can be added to the block header of the parent block. A given validator may execute the additional execution and verification rules from the block header to have a deterministic reference to the current validator set, which is required to determine who to select as validator proposers by the proposer module 412. For example, the deterministic reference can refer to the external blockchain. The deterministic reference and the current validator set can be in a one-to-one relationship; that is, there may be a corresponding validator set mapped for each outer block header that wraps an inner block of the existing blockchain. As such, next block proposers may be determined for each block header.

The proposer module 412 is configured to manage a proposal process for the congestion control protocol. For example, the proposer module 412 can produce a list of validators who are prioritized in terms of producing a block proposed for addition to the existing blockchain, such as to the parent block. The proposer module 412 may manage and control the rolling window, such as via shifting validator/submission windows to determine which of various validators/proposers are permitted to produce blocks for the existing blockchain. The proposer module 412 can determine the order and priority at particular block heights. For example, the order and priority for the consensus portion can be determined based on the referenced external blockchain as a beacon. The proposer module 412 may select the validator proposers by performing deterministic random samplings of the current validator set. For example, the deterministic random samplings can be used to determine the list of proposers generally for the blocks of the existing blockchain, including the current validator set for each specific block of the existing blockchain that is subject to addition or expansion via the child block. The selected validator proposers may be the only validators/proposers allowed to produce the child block for the parent block. The security of the deterministic random samplings may be maintained based on using a predetermined block height, which is constant and cannot be changed, to seed the deterministic random samplings.

The validation module 414 is configured to perform a validation process based on the block headers. For example, the validation process can involve communication between the validators of the computing platform(s) 402 and obtaining signature therefrom for insertion into the block headers. The validation module 414 may perform the validation process for VMs (e.g., subnet VMs) implemented based on the platform chain or otherwise associated with the computing platform(s) 402 without determining a block leader and/or the creator(s) of the VMs having to determine who proposes the next block of the existing blockchain. The next block proposal mechanism can be embedded via the introduced block headers of the wrapping blockchain. Rather than determining the block leader, the validation module 414 can validate whether a given proposed block is valid. The consensus portion of the congestion control protocol can accept or reject the valid block as the child block of the parent block for expanding the existing blockchain, such as via the blockchain deployment module 410. Accordingly, the consensus portion can be externally managed relative to the creator(s) of the VMs. The consensus portion can manage proposed blocks for deciding on a specific change for the blockchain network represented by the computing system 400 so as to reduce or eliminate the diverging off-shoot branches in order to maintain the linearity of the existing blockchain.

The congestion module 416 is configured to manage candidate block proposals for the parent block. The parent block may include limiting conflicting proposals. The congestion module 416 can apply temporal submission windows based on adding temporal characteristics to the block headers and/or from the random validator set samplings from the proposer module 412. As such, the congestion module 416 may control voting, such as voting on blockchain transactions, relative to the existing blockchain. As an example, the congestion module 416 may limit voting on proposals or block production at a particular height (or time) to one proposer (or a limited set of proposers). Thus, for example, for the particular height, only one block producer can exist or create a block rather than having to vote concurrently/simultaneously on a significant quantity (e.g., 100) of blocks being proposed. This may reduce the time complexity of the congestion control protocol applied by the computing platform(s) 402. In general, the congestion module 416 can control and limit the number of proposers who are able to propose blocks at a given time (e.g., reducing the quantity of selected valid proposers from the validator set).

The congestion module 416 can incrementally expand selection of valid proposers from an initial one valid proposer to progressively more over time, for example. As an example, the quantity of valid proposers can increase from one to two to three to four to five until thirty seconds has elapsed without anyone producing a block such that any validator may thereafter produce a block. The incremental rolling submission windows can be managed by the congestion module 416 based on the added temporal characteristics and/or the time parameter of the block headers added by the block header module 408. In this way, the congestion module 416 and proposer module 412 can track how long a current selected validator proposer has taken (e.g., what duration of time has passed/elapsed since the most recent prior candidate block was proposed). For example, the rolling window described herein can refer to progressively or incrementally granting submission windows to incrementally more selected validator proposers as more time elapses since the most recent block was produced and issued for the existing blockchain, until all validators are permitted to propose blocks. This mechanism can account for an assumption that a given validator proposer that hasn't produced blocks can be offline or otherwise not operating. In general, the congestion module 416 may control when to instruct or request validator nodes to produce blocks when it is a correct submission window (e.g., a time slot to produce) for the corresponding validator node to be a valid validator proposer, which can advantageously improve computation efficiency. The validation module 414 can check whether the produced block is a signed valid block that can be considered in the consensus portion.

In some implementations, the computing platform(s) 402, the remote platform(s) 404, and/or the external resources 424 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 402, the remote platform(s) 404, and/or the external resources 424 may be operatively linked via some other communication media.

A given remote platform 404 may include client computing devices, which may each include one or more processors configured to execute computer program modules. The computer program modules may be configured to enable an expert or user associated with the given remote platform 404 to interface with the system 400 and/or external resources 424, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms. The external resources 424 may include sources of information outside of the system 400, external entities participating with the system 400, and/or other resources. For example, the external resources 424 may include externally designed blockchain elements and/or applications designed by third parties. In some implementations, some or all of the functionality attributed herein to the external resources 424 may be provided by resources included in system 400.

The computing platform(s) 402 may include the electronic storage 426, a processor such as the processors 205, and/or other components. The computing platform(s) 402 may include communication lines, or ports to enable the exchange of information with a network and/or other computing platforms. Illustration of the computing platform(s) 402 in FIG. 4 is not intended to be limiting. The computing platform(s) 402 may include a plurality of hardware, software, and/or firmware components operating together to provide the functionality attributed herein to the computing platform(s) 402. For example, the computing platform(s) 402 may be implemented by a cloud of computing platforms operating together as the computing platform(s) 402.

The electronic storage 426 may include non-transitory storage media that electronically stores information. The electronic storage media of the electronic storage 426 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). The electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 426 may include one or more virtual storage resources (e.g., cloud storage, a virtual private network, and/or other virtual storage resources). The electronic storage 426 may store software algorithms, information determined by the processors 205, information received from computing platform(s) 402, information received from the remote platform(s) 404, and/or other information that enables the computing platform(s) 402 to function as described herein.

Processors 205 may be configured to provide information processing capabilities in the computing platform(s) 402. As such, the processors 205 may include one or more of a digital processor, an analog processor, a digital circuit designed to process information, an analog circuit designed to process information, a state machine, and/or other mechanisms for electronically processing information. Although the processors 205 is shown in FIG. 1 as a single entity, this is for illustrative purposes only. In some implementations, the processors 205 may include a plurality of processing units. These processing units may be physically located within the same device, or the processors 205 may represent processing functionality of a plurality of devices operating in coordination. Processors 205 may be configured to execute modules 408, 410, 412, 414, 416, and/or other modules. Processors 205 may be configured to execute modules 408, 410, 412, 414, 416, and/or other modules by software; hardware; firmware; some combination of software, hardware, and/or firmware; and/or other mechanisms for configuring processing capabilities on the processors 205. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules 408, 410, 412, 414, and/or 416 are illustrated as being implemented within a single processing unit, in implementations in which the processors 205 include multiple processing units, one or more of the modules 408, 410, 412, 414, and/or 416 may be implemented remotely from the other modules. The description of the functionality provided by different modules 408, 410, 412, 414, and/or 416 described herein is for illustrative purposes, and is not intended to be limiting, as any of the modules 408, 410, 412, 414, and/or 416 may provide more or less functionality than is described. For example, one or more of the modules 408, 410, 412, 414, and/or 416 may be eliminated, and some or all of its functionality may be provided by other ones of the modules 408, 410, 412, 414, and/or 416. As another example, processors 205 may be configured to execute one or more additional modules that may perform some or all of the functionality attributed below to one of the modules 408, 410, 412, 414, and/or 416.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
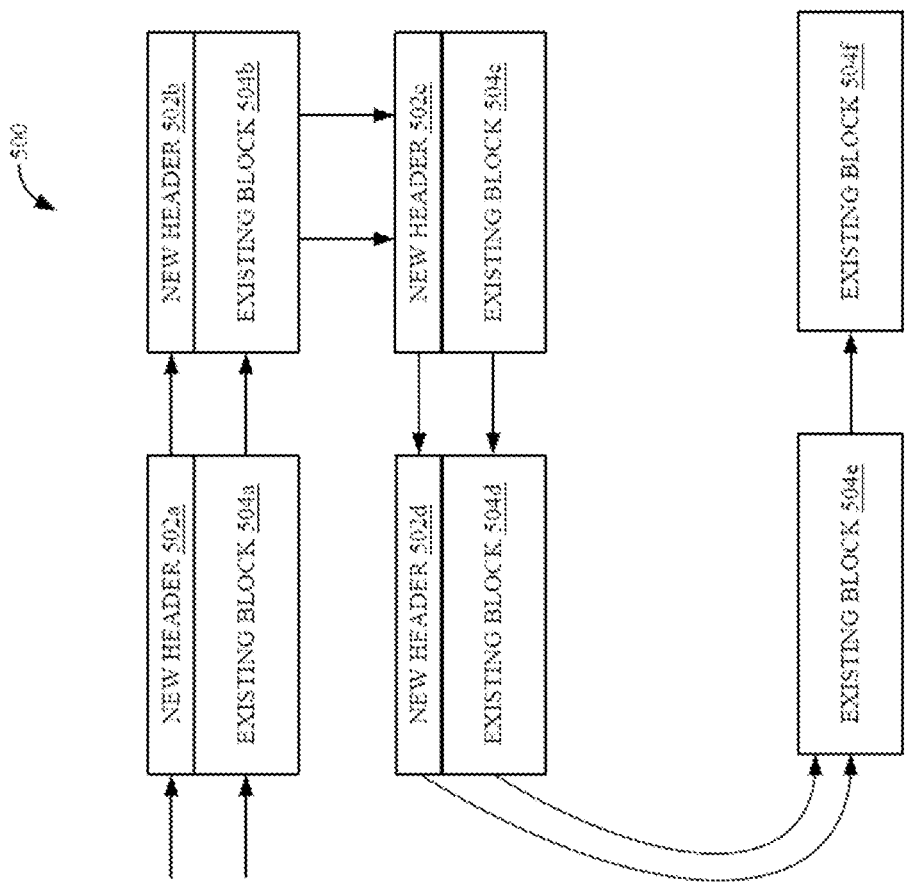
FIG. 5 is a block diagram illustrating a blockchain arrangement including a wrapped blockchain with block headers, according to certain aspects of the present disclosure.

FIG. 5 is a block diagram 500 illustrating an example blockchain arrangement including a wrapped blockchain with block headers, according to certain aspects of the present disclosure. For example, an existing blockchain or embedded inner block may be wrapped with an outer blockchain including a plurality of new block headers 502a-502d. Embodiments are not limited to this. That is, the outer blockchain may include any integer quantity of new block headers greater than or equal to 2. The plurality of block headers 502a-502d can be introduced and included with the existing inner blockchain as a wrapping outer blockchain. The plurality of block headers 502a-502d can be configured to manage validation logic for implementing a soft proposer mechanism for the example blockchain arrangement. The plurality of block headers 502a-502d may include a payload so that a blockchain platform (e.g., comprising a platform metadata chain) of the blockchain arrangement performs additional execution and verification rules based on the payload. As described herein, the additional execution and verification rules can be part of the soft proposer mechanism for controlling which validators are valid proposers for proposing valid signed blocks during corresponding submission windows.

The valid signed proposed blocks (e.g., candidate child blocks) should be a corresponding dimension (e.g., size, height, etc.) to a parent block of the existing inner blockchain. The plurality of block headers 502a-502d being added may specify inputs to the additional execution and verification rules. For example, candidate blocks proposed according to a consensus protocol/mechanism including the soft proposer mechanism may define inputs to the execution and verification rules. The plurality of block headers 502a-502d may enable execution of the additional logic of the execution and verification rules before, during, and after processing of the existing "next" block of the existing inner block. As an example, the additional logic may be configured for execution of pre-fork execution mode, fork transition execution mode, and post-fork execution mode relative to an activation time of the soft proposer mechanism, according to the execution modes described herein. The plurality of block headers 502a-502d can include a reference to the existing blockchain. For example, the reference can be a reference to a plurality of validators (e.g., including or being a blockchain validator set for selecting/sampling block proposers). For example, block proposers can be sampled from the validator set, such as via a deterministic random sampling.

The included reference may allow one or more validators of the plurality of validators to perform validation of each of the plurality of block headers 502a-502d. For example, a given validator may execute the additional verification of a given header of the plurality of block headers 502a-502d to provide a deterministic reference to the blockchain validator set from an external blockchain (e.g., obtaining proposer sets from an external third blockchain relative to the existing inner blockchain and wrapping blockchain). That is, the validator set can be required for the blockchain platform to determine who to select as validator proposers. The external third blockchain may function as an oracle/beacon to provide an indication of (or mechanism to determine) priority and ordering of blocks at various heights for the soft proposer mechanism. The blockchain platform can also add a temporal characteristic (e.g., a notion of time to track block proposals). As an example, the temporal characteristic may enable the blockchain platform to determine a duration of time for a block proposal since the previous proposed block (e.g., time between successive block proposals by block proposers in corresponding submission windows). The temporal characteristic may be used to determine a quantity of valid proposers selected from the validator set. For example, as the duration of time (e.g., delay since last block was proposed/issued) increases, relatively higher quantities of valid proposers are permitted such that more validators are progressively selected. In other words, the temporal characteristic can be used to deterministically calculate proposal delay.

For example, a set of valid proposers may initially only include one sampled/selected proposer but the set of valid proposers may incrementally increase to include additional sampled/selected proposers from the validator set as more time elapses since the last block was issued. Each sampled valid proposer may be assigned an associated submission window for submitting block proposals. Other types of time intervals or slots may be assigned to varying selections of valid proposers based on the specific details of the consensus mechanism employed by the blockchain platform. Selected validators may or may not produce a block during their time slots, but they may not validly produce blocks prior to activation of their time slots, for example. Validators can be selected by various deterministic random samplings of the validator set, such as to create a deterministic set of validators that are allowed to produce the next block of the existing blockchain. The next block must be a valid child block of the previous parent block of the existing blockchain (e.g., having matching dimensions), for example. The manner in which the block headers of the outer wrapping blockchain wrap around the inner existing blockchain is illustrated by FIG. 5.

Additionally, the outer wrapping blockchain may contain references to the external third blockchain for receiving valid proposer sets. Existing blocks 504a-504f of the existing blockchain can point to each other, such as sequentially in a linear blockchain. The new headers 502a-502d of the outer wrapping blockchain have reference(s) to the existing blockchain and act as modifier(s) for the execution and verification rules to determine the proposer(s) for the next block. Based on sampling proposers and the incrementally increasing timing mechanism for block production, proposed blocks can be agreed upon via the consensus mechanism and soft proposer mechanism of the blockchain platform. In this way, blocks 504e-504f can be proposed and issued as part of the existing blocks 504a-504f, for example. The added headers and reference of the outer wrapping blockchain, as well as the disclosed blockchain architecture generally, may implement the soft proposer mechanism with less conflicting concurrent block proposals, which may advantageously increase computation speed and reduce contention and computation load for various blockchain arrangements.

Figure 6:
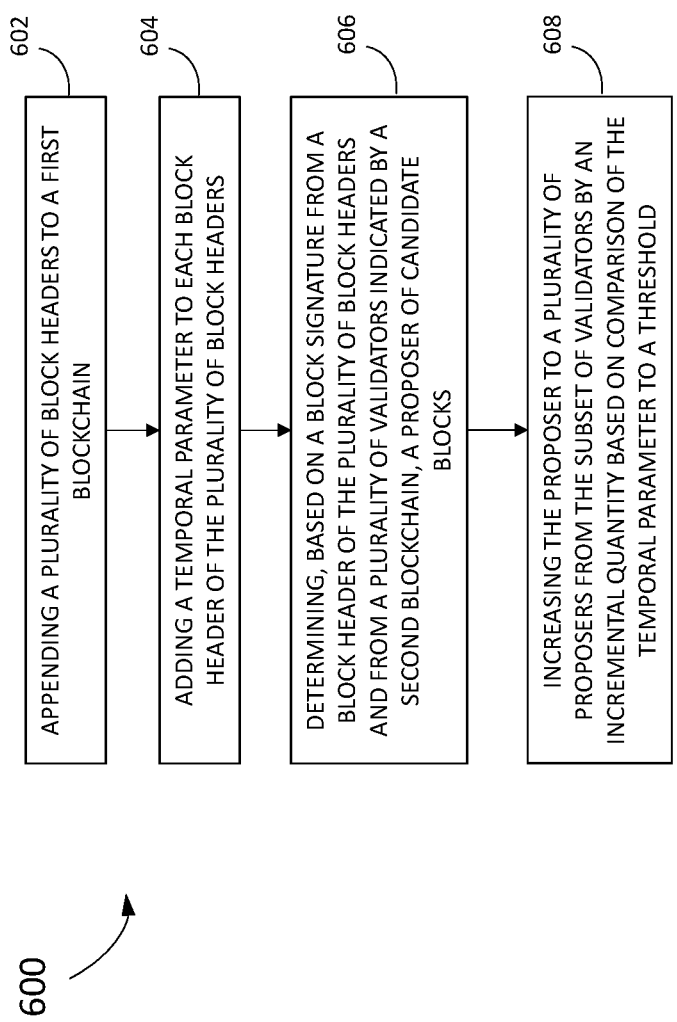
FIG. 6 is an example flow diagram for proposing blocks to be added to a blockchain, according to certain aspects of the present disclosure.

FIG. 6 illustrates an example flow diagram (e.g., process 600) for generating a non-transferable blockchain security credential via a computing platform, according to certain aspects of the disclosure. For explanatory purposes, the example process 600 is described herein with reference to one or more of the figures above. Further for explanatory purposes, the blocks of the example process 600 are described herein as occurring in serial, or linearly. However, multiple instances of the example process 600 may occur in parallel, overlapping in time, almost simultaneously, or in a different order from the order illustrated in the process 600. In addition, the blocks of the example process 600 need not be performed in the order shown and/or one or more of the blocks of the example process 600 need not be performed.

At step 602, a plurality of block headers to a first blockchain may be received. For example, the plurality of block headers includes references to a plurality of validators of the first blockchain. In some implementations, the plurality of validators is indicated by a second blockchain (i.e., other than the first blockchain). According to an aspect, appending (e.g., adding) the plurality of block headers to the first blockchain includes adding one of the plurality of block headers to each block of the first blockchain. For example, each of the plurality of block headers includes block header fields including at least one of: a parent identification field, a timestamp field, a chain height field, a certificate field, or a signature field.

At step 604, a temporal parameter to each block header of the plurality of block headers may be added. According to an aspect, adding the temporal parameter to each block header includes determining a submission time window for each of the plurality of validators to propose blocks to be added to the first blockchain. According to an aspect, adding the temporal parameter to each block header includes determining a timestamp for each child block of a parent block.

At step 606, a proposer of candidate blocks for addition to the first blockchain may be determined based on a block signature from a block header of the plurality of block headers and from the plurality of validators. According to an aspect, determining the proposer of candidate blocks includes determining a certificate from the block header certifying that the block signature belongs to the proposer of a block to be added to the first blockchain.

At step 608, the proposer may be increased to a plurality of proposers from the subset of validators by an incremental quantity based on a comparison of the temporal parameter to a threshold. According to an aspect, increasing the proposer to the plurality of proposers includes progressively increasing a quantity of permitted proposers of candidate blocks by the incremental quantity according to the temporal parameter. For example, wherein the temporal parameter defines a quantity of time since a last block was proposed. According to an aspect, the process 600 may further include determining a subnet. According to an aspect, the process 600 may further include extracting, for the subnet, the plurality of validators as a list from the second blockchain, wherein the second blockchain includes a metadata blockchain. According to an aspect, the process 600 may further include determining, for the proposer and via a corresponding block header of the plurality of the block headers, a proposed candidate block having a height corresponding to a parent block of the first blockchain. The process 600 may include wrapping a third blockchain including the plurality of block headers on the first blockchain.

According to aspects, a subset of validators of the plurality of validators may be sampled based on the temporal parameter. According to an aspect, sampling the subset of validators includes determining a plurality of block proposers by deterministic sampling via a random number generator.

The techniques described herein (for example, method 300 and process 600) may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIGS. 3 and 6 may be performed by a processor circuit executing instructions stored in a memory circuit, in a client device, a remote server or a database, communicatively coupled through a network (e.g., processors 205, memories 220, participant 110, participant 130, databases 152, and network 150). In some embodiments, one or more of the operations/steps in method 300/process 600 may be performed by an application engine including a messaging tool. In some embodiments, methods consistent with the present disclosure may include at least one or more operations/steps as in method 300/process 600 performed in a different order, simultaneously, quasi-simultaneously or overlapping in time.

Although FIGS. 3 and 6 shows example blocks of the method 300/process 600, in some implementations, the method 300/process 600 may include additional blocks, fewer blocks, different blocks, or differently arranged blocks than those depicted in FIGS. 3 and 6. Additionally, or alternatively, two or more of the blocks of the method may be performed in parallel.

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

The computer system 700 (e.g., server and/or client) includes a bus 708 or other communication mechanism for communicating information, and a processor 702 coupled with the bus 708 for processing information. By way of example, the computer system 700 may be implemented with one or more processors 702. Each of the one or more processors 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. Processor 702 and memory 704 can be supplemented by, or incorporated in, special purpose logic circuitry.

The instructions may be stored in memory 704 and implemented in one or more computer program products, i.e., one or more modules of computer program instructions encoded on a computer-readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by the processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 700 further includes a data storage device 706 such as a magnetic disk or optical disk, coupled to bus 708 for storing information and instructions. The computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described systems can be implemented using a computer system 700 in response to the processor 702 executing one or more sequences of one or more instructions contained in the memory 704. Such instructions may be read into memory 704 from another machine-readable medium, such as data storage device 706. Execution of the sequences of instructions contained in the main memory 704 causes the processor 702 to perform the process steps described herein. One or more processors in a multi-processing arrangement may also be employed to execute the sequences of instructions contained in the memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 700 can include clients and servers. A client and server are generally remote from each other and typically interact through a communication network. The relationship of client and server arises by virtue of computer programs running on the respective computers and having a client-server relationship to each other. The computer system 700 can be, for example, and without limitation, a desktop computer, laptop computer, or tablet computer. The computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 702 for execution. Such a medium may take many forms, including, but not limited to, non-volatile media, volatile media, and transmission media. Non-volatile media include, for example, optical or magnetic disks, such as the data storage device 706. Volatile media include dynamic memory, such as the memory 704. Transmission media include coaxial cables, copper wire, and fiber optics, including the wires that comprise the bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for proposing blocks to be added to a blockchain, the method comprising:
    appending a plurality of block headers to a first blockchain, wherein the plurality of block headers includes references to a plurality of validators;
    adding a temporal parameter to each block header of the plurality of block headers;
    determining, based on a block signature from a block header of the plurality of block headers and from the plurality of validators, a proposer of candidate blocks for addition to the first blockchain; and
    increasing the proposer to a plurality of proposers from a subset of validators by an incremental quantity based on a comparison of the temporal parameter to a threshold.

2. The computer-implemented method of claim 1, wherein adding the plurality of block headers to the first blockchain comprises adding one of the plurality of block headers for each block of the first blockchain, wherein each of the plurality of block headers include block header fields that include at least one of: a parent identification field, a timestamp field, a chain height field, a certificate field, or a signature field.

3. The computer-implemented method of claim 1, wherein adding the temporal parameter to each block header comprises determining a submission time window for each of the plurality of validators to propose blocks to be added to the first blockchain.

4. The computer-implemented method of claim 1, wherein adding the temporal parameter to each block header comprises determining a timestamp for each child block of a parent block.

5. The computer-implemented method of claim 1, wherein determining the proposer of candidate blocks comprises determining a certificate from the block header certifying that the block signature belongs to the proposer of a block to be added to the first blockchain.

6. The computer-implemented method of claim 1, wherein sampling the subset of validators comprises determining a plurality of block proposers by deterministic sampling via a random number generator.

7. The computer-implemented method of claim 1, wherein increasing the proposer to the plurality of proposers comprises progressively increasing a quantity of permitted proposers of candidate blocks by the incremental quantity according to the temporal parameter, wherein the temporal parameter defines a quantity of time since a last block was proposed.

8. The computer-implemented method of claim 1, wherein increasing the proposer to the plurality of proposers comprises permitting the plurality of validators based on the comparison of the temporal parameter to the threshold being indicative of a quantity of time elapsed without generation of new blocks.

9. The computer-implemented method of claim 1, further comprising:
    determining a subnet; and
    extracting, for the subnet, the plurality of validators as a list from a second blockchain, wherein the second blockchain includes a metadata blockchain.

10. The computer-implemented method of claim 1, further comprising:
- determining, for the proposer and via a corresponding block header of the plurality of the block headers, a proposed candidate block having a height corresponding to a parent block of the first blockchain; and
- wrapping a third blockchain including the plurality of block headers on the first blockchain.

11. A system for proposing blocks to be added to a blockchain, comprising:
- one or more processors; and
- a memory comprising instructions stored thereon, which when executed by the one or more processors, causes the one or more processors to perform:
  - appending a plurality of block headers to a first blockchain, wherein the plurality of block headers includes references to a plurality of validators;
  - adding a temporal parameter to each block header of the plurality of block headers;
  - determining, based on a block signature from a block header of the plurality of block headers and from the plurality of validators, a proposer of candidate blocks for addition to the first blockchain;
  - determining, for the proposer and via a corresponding block header of the plurality of the block headers, a proposed candidate block having a height corresponding to a parent block of the first blockchain;
  - sampling, based on the temporal parameter, a subset of validators of the plurality of validators; and
  - increasing the proposer to a plurality of proposers from the subset of validators by an incremental quantity based on a comparison of the temporal parameter to a threshold.

12. The system of claim 11, wherein the instructions that cause the one or more processors to perform adding the plurality of block headers to the first blockchain cause the one or more processors to perform adding one of the plurality of block headers for each block of the first blockchain, wherein each of the plurality of block headers include block header fields that include at least one of: a parent identification field, a timestamp field, a chain height field, a certificate field, or a signature field.

13. The system of claim 11, wherein the instructions that cause the one or more processors to perform adding the temporal parameter to each block header cause the one or more processors to perform determining a submission time window for each of the plurality of validators to propose blocks to be added to the first blockchain.

14. The system of claim 11, wherein the instructions that cause the one or more processors to perform determining the proposer of candidate blocks cause the one or more processors to perform determining a certificate from the block header certifying that the block signature belongs to the proposer of a block to be added to the first blockchain.

15. The system of claim 11, wherein the instructions that cause the one or more processors to perform sampling the subset of validators includes determining a plurality of block proposers by deterministic sampling via a random number generator.

16. The system of claim 11, wherein the instructions that cause the one or more processors to perform increasing the proposer to the plurality of proposers includes progressively increasing a quantity of permitted proposers of candidate blocks by the incremental quantity according to the temporal parameter, wherein the temporal parameter defines a quantity of time since a last block was proposed.

17. The system of claim 11, wherein the instructions that cause the one or more processors to perform increasing the proposer to the plurality of proposers includes permitting the plurality of validators based on the comparison of the temporal parameter to the threshold being indicative of a quantity of time elapsed without generation of new blocks.

18. The system of claim 11, further comprising stored sequences of instructions, which when executed by the one or more processors, cause the one or more processors to perform:
- determining a subnet; and
- extracting, for the subnet, the plurality of validators as a list from a second blockchain, wherein the second blockchain includes a metadata blockchain.

19. The system of claim 11, further comprising stored sequences of instructions, which when executed by the one or more processors, cause the one or more processors to perform:
- determining, for the proposer and via a corresponding block header of the plurality of the block headers, a proposed candidate block having a height corresponding to a parent block of the first blockchain; and
- wrapping a third blockchain including the plurality of block headers on the first blockchain.

20. A non-transitory computer-readable storage medium comprising instructions stored thereon, which when executed by one or more processors, cause the one or more processors to perform operations for proposing blocks to be added to a blockchain, comprising:
- appending a plurality of block headers to a first blockchain, wherein the plurality of block headers includes references to a plurality of validators;
- wrapping a third blockchain including the plurality of block headers on the first blockchain;
- adding a temporal parameter to each block header of the plurality of block headers;
- determining, based on a block signature from a block header of the plurality of block headers and from the plurality of validators, a proposer of candidate blocks for addition to the first blockchain;
- determining, for the proposer and via a corresponding block header of the plurality of the block headers, a proposed candidate block having a height corresponding to a parent block of the first blockchain;
- sampling, based on the temporal parameter, a subset of validators of the plurality of validators; and
- increasing the proposer to a plurality of proposers from the subset of validators by an incremental quantity based on a comparison of the temporal parameter to a threshold.

\* \* \* \* \*